United States Patent [19]

Iwasaki et al.

[11] 4,328,119
[45] May 4, 1982

[54] METHOD OF MAKING MICROCAPSULES

[75] Inventors: Hiroshi Iwasaki, Kawanishi; Shinsuke Irii, Nishinomiya, both of Japan

[73] Assignee: Kanzaki Paper Manufacturing Co., Ltd., Tokyo, Japan

[21] Appl. No.: 94,191

[22] Filed: Nov. 14, 1979

[30] Foreign Application Priority Data

Nov. 14, 1978 [JP] Japan ................................ 53-140805

[51] Int. Cl.³ ............................................ B01J 13/02
[52] U.S. Cl. .................................. 252/316; 428/914; 428/320.4; 282/27.5
[58] Field of Search ........................ 252/316; 528/259

[56] References Cited

U.S. PATENT DOCUMENTS 3,607,775 9/1971 Yoshida et al. ..................... 252/316
4,001,140 1/1977 Foris et al. .......................... 252/316
4,101,521 7/1978 Renner ............................ 528/259 X

FOREIGN PATENT DOCUMENTS 2832637 2/1979 Fed. Rep. of Germany ...... 252/316

Primary Examiner—Richard D. Lovering
Attorney, Agent, or Firm—Cushman, Darby & Cushman

[57] ABSTRACT

In the method of making microcapsules polycondensation for forming an anion-modified aminoaldehyde resin is performed in the presence of at least one anionic colloid material in an aqueous dispersion including hydrophobic material particles dispersed therein to deposit said anion-modified aminoaldehyde resin on said hydrophobic material particles to form microcapsules encapsulating hydrophobic capsule core material therein.

13 Claims, No Drawings

METHOD OF MAKING MICROCAPSULES

BACKGROUND OF THE INVENTION

This invention relates to a method of making microcapsules containing hydrophobic capsule core material and more particularly to a method of making microcapsules having an improved capsule core material retainability.

Microcapsules find their usefulness in various fields such as pressure-sensitive copying papers, heat-sensitive recording papers, adhesives, fertilizers, pharmaceuticals, food, cosmetics, etc. There are various known methods for making microcapsules useful for those purposes. Among them, there are included the "coacervation" method, the "interfacial polycondensation" method and the "in situ polymerization" method. It is also known that microcapsules each having a capsule wall of an aminoaldehyde resin are superior in the water resistance and the solvent resistance. For example, U.S. Pat. No. 3,016,308 discloses a method of making microcapsules in which urea-formaldehyde polycondensation resin capsule walls are formed in the presence of carboxymethyl cellulose. U.S. Pat. No. 3,516,941 discloses another method of making microcapsules in which ureaformaldehyde polycondensation resin capsule walls are formed in a suspension substantially containing no wetting agent. In these conventional methods of making microcapsules utilizing urea-formaldehyde resin, however, the system for making microcapsules must be carefully controlled as by stepwise and continual dilution since effective deposition of the polycondensation product on the capsule core material cannot be expected. In order to effectively carry out deposition of the polymerized resin on the capsule core material, some attempts have been made. For example, Japanese Patent Publication No. 12,380 of 1962 proposes to utilize as a dispersing agent a substance having an active radical which is capable of causing chemical or physicochemical bond and each of Japanese Patent Publications Nos. 12,518 of 1963, 4,717 of 1973 and 13,456 of 1974 discloses to utilize phase separation by an electrostatic interaction. In these improved methods, however, the steps for making microcapsules are complicated as well as in the so-called "complex coacervation" method. Those methods also involve a disadvantage in that the capsule walls are often cracked in the step of drying. This may be considered due to the fact that the microcapsule walls contain water soluble components having opposite net electrical charges.

The principal object of the invention is to provide a novel and improved method for making microcapsules each having a capsule wall of an aminoaldehyde resin in which deposition of an aminoaldehyde polycondensation resin on the surface of a capsule core material is effectively carried out.

Another object of the invention is to provide an improved method for performing polycondensation of an anion-modified aminoaldehyde resin in a microcapsule making system to deposit the anion-modified aminoaldehyde resin on each of capsule core material particles for encapsulation.

A further object of the invention is to provide a novel and improved method of making microcapsules having a good water resistance and a good solvent resistance in a simple and effective manner.

SUMMARY OF THE INVENTION

According to the invention, the method for making microcapsules comprises the steps of preparing an aqueous dispersion including hydrophobic material particles dispersed therein, establishing in said dispersion a system for causing polycondensation to form an anion-modified aminoaldehyde resin and performing said polycondensation to deposit said anion-modified aminoaldehyde resin on said hydrophobic material particles to form microcapsules encapsulating said hydrophobic material therein, and characterized in that said polycondensation is carried out in the presence of at least one anionic colloid material. Preferably, the anion-modified aminoaldehyde resin is one modified by an anion-modifying agent selected from the group consisting of sulfamic acid, sulfanilic acid, glycine and combination of the foregoing.

In a preferred embodiment of the invention, the system for causing polycondensation for forming an anion-modified aminoaldehyde resin comprises a prepolymer of at least one amine and at least one aldehyde.

DETAILED DESCRIPTION OF THE INVENTION

According to the invention, the microcapsules have a capsule wall of an anion-modified aminoaldehyde resin obtained by polycondensation. The microcapsules can be produced by performing the polycondensation to form an anion-modified aminoaldehyde resin in the presence of at least one anionic colloid material in an aqueous dispersion including hydrophobic capsule core material particles dispersed therein. The hydrophobic capsule core material may be either of the liquid phase or of the solid phase. Among typically useful capsule core materials, there may be included: water-insoluble or substantially water-insoluble liquids such as animal oils, e.g. fish oil, and lard oil, vegetable oils, e.g. olive oil, peanut oil, linseed oil, soy-bean oil, and castor oil, mineral oils, e.g., petroleum, kerosene, xylene and toluene, and synthetic oils, e.g., alkylated diphenylethane alkylated naphthalene, diphenylethane and methyl salicylate; water-insoluble metal oxides and salts; fibrous materials, e.g., cellulose and asbestos; water insoluble synthetic polymers; minerals; pigments; glasses; perfumes; flavourings; germicidal compositions; physiological compounds and fertilizers.

For pressure sensitive copying paper the above-mentioned oils as capsule core materials may include at least one chromogenic material dissolved therein.

According to the invention, an anion-modified aminoaldehyde resin is used as capsule wall forming material. The term "anion-modified aminoaldehyde resin" described means an aminoaldehyde resin modified by a modifier so as to become anionic.

The aminoaldehyde resin is obtained by polycondensation of at least one amine, such as urea, thiourea, alkyl urea, ethylene urea, acetoguanamine, Benzoguanamine, melamine, quanidine, dicyandiamide, biuret and cyanamide and at least one aldehyde such as formaldehyde, acetaldehyde, paraformaldehyde, hexamethylenetetramine, butylaldehyde, crotonaldehyde, benzaldehyde and furfural.

The aminoaldehyde resin is modified with an anion-modifier, such as sulfamic acid, sulfanilic acid, glycolic acid, glycine, acid sulfite, phenolsulfonic acid and taurine.

Among the anion-modified aminoaldehyde resins, those in which urea and/or melamine and formaldehyde are used as starting materials and at least one of sulfamic acid, sulfanilic acid and glycine is used as the anion-modifier are preferred because the capsule wall obtained has a greatly improved core material retainability and a greatly improved impermeability.

The above-mentioned anion-modifier may be used in an amount of 1 to 50 mol %, preferably 2 to 20 mol %, with respect to the amount of the amine used.

The anion-modified aminoaldehyde resin used according to the invention may also include any of other polycondensation components such as phenol, m-methoxyphenol, resorcin, pyrogallol and the like for changing the other properties of the capsule wall as desired. As a matter of course, the amount of such other polycondensation components included should be within such the range that the desirable effects according to the invention can be achieved an maintained.

The system for causing polycondensation to form an anion-modified aminoaldehyde resin according to the invention is established in the before-mentioned aqueous dispersion including hydrophobic capsule core material particles dispersed therein. Preferably, the system for causing polycondensation comprises a water soluble prepolymer ofat least one amine and at least one aldehyde,. In case of using a water soluble prepolymer of at least one amine and at least one aldehyde, the anion-modifier may either be previously bonded to the prepolymer or be separately added to the aqueous dispersion. However, the system for causing polycondensation may also be established in the aqueous dispersion of capsule core material by adding at least one amine monomer, at least one aldehyde monomer and at least one anion-modifier separately and directly to said aqueous dispersion.

According to the invention, the polycondensation to form an anion-modified aminoaldehyde resin is performed in presence of at least one anionic colloid material in said aqueous dispersion of hydrophobic capsule core material.

Among the typically useful anionic colloid materials, there may be included natural polymers such as gum arabic, carrageenan, sodium alginate, pectic acid, tragacanth gum, almond gum and agar, semisynthetic polymers such as carboxymethylcellulose, sulfonated cellulose, sulfonated methylcellulose, carboxymethylated starch and phosphorated starch and synthetic polymers such as polymers having at least one anionic monomer unit such as acrylic acid, methacrylic acid, maleic acid, crotonic acid, itaconic acid and vinyl-benzene sulfonic acid, partial amidation compound or partial esterification compound thereof and carboxylated polyvinyl alcohol.

Especially in case where the capsule core material is a hydrophobic liquid such as oily material, anionic synthetic polymers having a hydrophobic monomer unit are preferably used for obtaining a stable emulsion. Most preferably, copolymers of hydrophobic monomers such as ethylene, propylene, isobutylene, styrene, methylvinyl ether, vinylacetate, acrylic acid ester, methacrylic acid ester and itaconic acid ester with at least one of acrylic acid, methacrylic acid and maleic acid are advantageously used because the capsule walls of the microcapsules obtained are not substantially deformed and have an improved physical and chemical strength.

The anionic colloid material may be used in an amount of at least 0.1% by weight of the amount of the aqueous dispersion. The preferred amount of the anionic colloid material for obtaining improved microcapsules in a simpler manner would be at least 0.5% by weight, most preferably, at least 2 % by weight of the amount of the aqueous dispersion. The upper limit of the amount of the anionic colloid material depends on the device used for making microcapsules but generally may be at largest 20% by weight of the aqueous dispersion. The polycondensation for forming an anion modified aminoaldehyde resin may preferably be performed in the above mentioned aqueous dispersion in an acidic state. In order to adjust the system for the production of microcapsules in an acidic state any of known acid catalysts such as formic acid acetic acid, citric acid, oxalic acid, parataluenesulphonic acid, hydrochloric acid, sulfuric acid ammonium chloride and ammonium sulfate may be used . For this purpose it is also possible to utilize the acidic radical included in the anionic colloid material which co-exists in the system according to the invention.

In order to accelerate the polycondensation, the system for the production of microcapsules may be heated at a temperature between the range of 20° to 100° C., most preferably, within the range of 35° to 70° C. In this manner microcapsules having stable properties can be produced for relatively short time.

According to the invention the polymerized resin is effectively deposited on each of the capsule core material particles. This can be achieved by merely admixing various materials for forming microcapsules and providing proper conditions for polycondensation. Careful control of the system as required in the conventional method, for example, by steadily adding water for dilution, is not needed. The theory and mechanism why the good result is obtained according to the invention are not clear. However, it may be assumed that the polycondensation product can effectively be deposited on the surface of capsule core material with the dispersion system being maintained in the stable condition, due to the repulsive force by electron charges of the anionic colloid material and the produced anionic aminoaldehyde resin.

DETAILED DESCRIPTION OF THE PREFERRED EMBODIMENT

The following examples serve to illustrate the invention in more detail although the invention is not limited to the examples. Unless otherwise indicated, parts and % signify parts by weight and % by weight, respectively.

EXAMPLE 1

2.8 parts of crystal violet lactone and 0.1 parts of benzoyl leucomethylene blue were dissolved in 100 parts of alkyl naphthalene (KMC oil manufactured by Kureha Kagaku Kogyo Kabushiki Kaisha, Japan) to prepare an oily solution. The oily solution was dispersed in 150 parts of a 3% aqueous solution (ph 4.0) of a hydrolized ethylene-maleic anhydride copolymer to obtain an emulsion containing oily capsule core material particles which have an average particle size of 3.4 microns. On the other hand 10 parts of melamine was added to 30 parts of a 37% aqueous solution of formaldehyde the pH of which was adjusted to 7.0 with sodium hydroxide and the mixture was heated at 70° C. for 30 minutes. Then to the mixture 10 parts of water and 1 part of sulfamic acid were added and the resultant aqueous system was heated at 60°C. for 2 minutes to prepare an aqueous solution of anion-modified melamine formaldehyde resin prepolymer. The prepolymer solution was slowly added and admixed into the above emulsion maintained at 55° C. Upon addition of the prepolymer solution formation of capsule walls was initiated. The emulsion system was gently agitated at the same temperature for 3 hours to form a microcapsule dispersion in which microcapsules, each having fully cured capsule wall and an average particle size of 3.6 microns, were dispersed.

Thus obtained mirocapsule dispersion was cooled on standing, and then 25 parts of cellulose powder and 200 parts of 2% aqueous solution of hydroxyethylcellulose were added to the microcapsule dispersion to prepare a capsule coating composition. The coating composition was coated on one surface of a paper sheet of 40g/m$^2$ in an amount of 4g/m$^2$ on dry basis and dried to obtain a capsule coated sheet.

CONTROL 1

Example 1 was repeated except that polyvinyl alcohol which was nonionic and water soluble colloid material, was used instead of ahydrolized ethylene-maleic anhydride copolymer. Resultantly, the emulsion system became very viscous after adding the prepolymer solution and then free oil was found in the system after completing the reaction. A capsule dispersion as desired was not obtained.

CONTROL 2

Example 1 was repeated except that an aqueous solution of a cationic gelatin having an isoelectric point of 8.0 was used, under the same capsule preparing condition, instead of the hydrolized ethylene-maleic anhydride copolymer. As the prepolymer solution was added, a remarkable tendency to cause agglomeration was observed. The resultant capsule dispersion was used to prepare a capsule coated paper sheet in the same manner as in Example 1.

EXAMPLES 2–5

4 capsule dispersions were prepared in the same manner as in Example 1 except that anionic colloid materials and anion modifying agents as shown in Table 1 were used. Capsule coated paper sheets were prepared with the use of the capsule dispersions in the same manner as in Example 1.

TABLE 1

|  | Anionic colloid materials | Anion modifying agents |
|---|---|---|
| Example 2 | Hydrolized product of isobutylene-maleic anhydride copolymer | sulfanilic acid |
| Example 3 | Hydrolized product of styrene-maleic anhydride copolymer | sulfamic acid |
| Example 4 | Maleic acid-modified polyvinyl alcohol | glycine |
| Example 5 | Carrageenan | sulfamic acid |

EXAMPLE 6

0.5 parts of m-methoxyphenol was added to 150 parts of 5% aqueous solution (pH 3.0) of acrylic acid-methyl acrylate copolymer to prepare an aqueous system. 100 parts of the same oily solution as in Example 1 was dispersed in the aqueous system to prepare an emulsion containing oily capsule core material particles which has an average particle size of 4.0 microns. On the other hand, 5 parts of monochloroacetic acid was dissolved in 80 parts of 37% aqueous solution of formaldehyde and the 7 parts of 25% ammonia water and 4 parts of sodium hydroxide were added to the solution. After the resultant mixture was throughly agitated, 30 parts of urea was added to it and the reaction mixture was refluxed for 30 minutes. The pH of the product was adjusted to 7.0 to prepare an aqueous solution of an anion-modified urea-formaldehyde resin prepolymer.

21 parts of the thus obtained prepolymer solution was added to the above emulsion. The resultant aqueous system has a pH of 3.4. The aqueous system was heated at 60° C. for 3 hours for reaction and then cooled with standing to prepare a capsule dispersion. The capsule dispersion was used to prepare a capsule coated paper sheet in the same manner as in Example 1.

EXAMPLES 7–9

3 capsule dispersions were prepared in the same manner as in Example 6 except that anionic colloid materials as shown in Table 2 were used and the pH of each of the dispersions after adding the prepolymer was adjusted to 3.4. The capsule dispersions were used to prepare capsule coated sheets in the same manner as in Example 1.

TABLE 2

|  | Anionic colloid materials |
|---|---|
| Example 7 | Half-amidation compound of isobutylene-maleic anhydride copolymer |
| Example 8 | Carboxymethylcellulose |
| Example 9 | Pectic acid |

EXAMPLE 10

5 parts of urea and 0.5 parts of glycine were added to and dissolved in 150 parts of 5% aqueous solution (pH 3.4) of a half-amidation compound of isobutylene-maleic anhydride copolymer to obtain a homogenous aqueous solution, 100 parts of the same oily solution as in Example 1 was dispersed in the aqueous solution to prepare an emulsion containing oily capsule core material particles which had an average particle size of 4.0 microns. 13 parts of 37% aqueous solution of formaldehyde was added to the emulsion. The mixture was heated to 55° C. under a gentle agitation, 5 parts of 10% aqueous solution of resorcin was added to the mixture after maintaining at 55° C. for 1 hour and then the mixture was further heated at 55° C. for 2 hours and cooled on standing to obtain a capsule dispersion. The resultant capsule dispersion was used to obtain a capsule coated paper sheet.

The properties of the thus obtained capsule coated paper sheets were examined with the following manner.

At first, an acceptor coated sheet was prepared by the steps of adding 65 parts of aluminum hydroxide, 20 parts of zinc oxide, 15 parts of a co-melt of zinc, 3,5-di(α-methylbenzyl) salicylate and α-methylstyrene-styrene copolymer in which the co-melting ratio was 80/20 and an aqueous solution containing 5 parts of polyvinyl alcohol to 300 parts of water, finely dividing the mixture for 24 hours in a ball-mill to obtain a dispersion, adding to the dispersion a latex of carboxylated styrene-butadiene copolymer in which the solid amount was 20 parts to prepare a coating composition, applying the coating composition on one surface of a base paper sheet of 40g/m² in an amount of 5g/m² on dry basis and drying the coated paper sheet.

1. Color formability:

Each capsule coated paper sheet obtained in the Examples and the Controls was put on the above acceptor coated sheet so that the coated layers were close to each other to provide samples. The samples were pressed with 100Kg/cm² for 1 minute to form a color image. The color density of the image on the acceptor coated surface was measured by a spectrophotometer at 600 nm with the use of magnesium oxide as a standard. The measured reflection ratios are shown in Table 3.

2. Stability of color forming:

Each capsule coated sheet obtained in Examples and Controls was treated by standing under the following conditions:

| (a) heat resistance | at 120° C. for 5 hours. |
| (b) solvent resistance | in saturated atmosphere with trichloroethylene for 1 day. |
| (c) humidity resistance | at 50° C., 90% RH for 1 day. |

The color densities of the samples after color images were formed were measured and the results are shown in Table 3 in terms of the color density decreasing ratios with the following ranks.

| A | from 0% to less than 5% |
| B | from 5% to less than 10% |
| C | from 10% to less than 20% |
| D | from 20% to less than 50% |
| E | above 50% |

TABLE 3

| | Color formability | Stability of Color Forming | | |
| --- | --- | --- | --- | --- |
| | | Heat resistance | Solvent resistance | Humidity resistance |
| Example 1 | 9 | B | A | A |
| Control 2 | 35 | E | E | E |
| Example 2 | 8 | A | A | A |
| Example 3 | 9 | B | A | A |
| Example 4 | 7 | A | A | A |
| Example 5 | 14 | B | C | B |
| Example 6 | 10 | A | A | A |
| Example 7 | 11 | A | A | B |
| Example 8 | 22 | C | C | B |
| Example 9 | 19 | B | C | B |
| Example 10 | 23 | B | C | B |

As shown in Table 3, every pressure sensitive copying systems prepared with the use of microcapsules obtained by the process of the invention were superior in heat resistance, solvent resistance and humidity resistance. However, no desired capsule dispersion was obtained in Control 1. Also, with the use of the capsule coating composition obtained in Control 2 a pressure sensitive copying system having desired heat resistance, solvent resistance and humidity resistance was not obtained.

What we claim is:

1. A method for making microcapsules containing hydrophobic capsule core material with improved capsule core material retainability essentially comprising the steps of:
   (a) preparing an aqueous dispersion having hydrophobic material particles and containing an anionic colloid material;
   (b) introducing in said dispersion, a pre-polymer of at least one aldehyde and at least one amine together with an anion modifier selected from the group consisting of sulfanilic acid, glycolic acid, glycine, acid sulfite, phenol sulfonic acid and taurine; and
   (c) inducing polycondensation of said aldehyde, amine and anion modifier to form in said dispersion a polycondensed anion modified aminoaldehyde resin whereby said hydrophobic particles are encapsulated by the thus polycondensed anion-modified aminoaldehyde resin.

2. A method of making microcapsules according to claim 1 wherein said anion-modified aminoaldehyde resin is an aminoaldehyde resin modified with at least one of sulfanilic acid and glycine.

3. A method of making microcapsules according to claim 1 wherein said hydrophobic material particles are oil droplets including at least one chromogenic material dissolved therein.

4. A method of making microcapsules according to claim 1 wherein said anion-modifier agent is used in an amount of 1 to 50 mol.% of the amine portion of said prepolymer.

5. A method of making microcapsules according to claim 4 wherein said anion-modifier agent is used in an amount of 2 to 20 mol.% of the amine portion of said prepolymer.

6. A method of making microcapsules according to claim 4 wherein said anionic colloid material is used in an amount of at least 0.5% by weight of the amount of said aqueous dispersion.

7. A method of making microcapsules according to claim 6 wherein said anionic colloid material is used in an amount of at least 2% by weight of the amount of said aqueous dispersion.

8. A method of making microcapsules according to claim 6 wherein the amount of said anionic colloid material used is not larger than 20% by weight of the amount of said aqueous dispersion.

9. A method of making microcapsules according to claim 1 in which said anionic colloid material is selected from the group consisting of gum arabic, carrageenan, sodium alginate, pectic acid, tragacanth gum, almond gum and agar, carboxymethylcellulose, sulfonated cellulose, sulfonated methylcellulose, carboxymethylated starch, phosphonated starch polymer, synthetic polymers having at least one anionic monomer unit selected from the group consisting of acrylic acid, methacrylic acid, maleic acid, crotonic acid, itaconic acid and vinylbenzene sulfonic acid, partial amidation compounds of said polymers, partial esterification compounds of said polymers, carboxylated polyvinyl alcohol and mixtures of the foregoing.

10. A method of making microcapsules according to claim 1 wherein said anionic colloid material is a copolymer of at least one hydrophobic monomer with at least one of acrylic acid, methacrylic acid and maleic acid.

11. A method of making microcapsules according to claim 1 in which said polycondensation is carried out at a temperature within the range of 20° to 100° C.

12. A method of making microcapsules according to claim 11 in which said polycondensation is carried out at a temperature within the range of 35° to 70° C.

13. A method for making microcapsules according to claim 1 wherein said dispersion is maintained in the acid state during said polycondensation.

* * * * *